United States Patent [19]

Groteke

[11] 4,455,238

[45] Jun. 19, 1984

[54] APPARATUS AND METHOD FOR FILTRATION OF A MOLTEN METAL STREAM

[75] Inventor: Daniel E. Groteke, 1228 Ridge Cliff Rd., Cincinnati, Ohio 45215

[73] Assignee: Daniel E. Groteke, Cincinnati, Ohio

[21] Appl. No.: 368,158

[22] Filed: Apr. 14, 1982

[51] Int. Cl.³ .............................................. C22B 9/02
[52] U.S. Cl. .................................... 210/773; 210/471; 266/230
[58] Field of Search .............. 75/68 R; 210/773, 470, 210/471, 510, 767, 774, 806; 266/227, 229–231, 238

[56] References Cited

U.S. PATENT DOCUMENTS 4,052,198 10/1977 Yarwood et al. ............... 210/773 X
4,124,506 11/1978 Dore .............................. 75/68 R X
4,165,235 8/1979 Dantzig et al. ................. 75/68 R X Primary Examiner—Thomas G. Wyse
Attorney, Agent, or Firm—Janine J. Weins; Michael J. Weins

[57] ABSTRACT

The present invention provides an apparatus and method for intersecting and filtering a molten metal stream. The apparatus includes a filtering vessel, which is fitted with a filter element. Means are provided for dampening the momentum of the molten metal stream so that the filter element is not damaged by impact with the molten metal stream. When not in use the filtering vessel can be placed within a molten metal bath for preheating. The present invention can be used to filter molten metal that is being intermittently transferred.

12 Claims, 4 Drawing Figures

APPARATUS AND METHOD FOR FILTRATION OF A MOLTEN METAL STREAM

DESCRIPTION

1. Field of the Invention

The present invention relates to an apparatus and a method for the filtration of a molten metal stream.

2. Background Art

Molten metal, and in particular molten aluminum, frequently contains impurities which are detrimental to the resulting cast product. These impurities may be oxides of the metal, inclusions introduced by fluxes used during melting, or products formed by interaction of the molten metal with the furnace lining. It is necessary to remove these impurities if optimum properties are desired in the cast product.

One technique for removing oxides and other impurities from molten metal is taught in copending U.S. Application Ser. No. 256,829, by the inventor of the present application and filed Apr. 23, 1981 and now issued as U.S. Pat. No. 4,394,271. In this technique a crucible is used to collect the filtered metal, a portion of the crucible is a porous filter material, and the rim of the crucible is protected by a shock resistant ring. The crucible is mounted in such a manner that a portion of the crucible is submerged in molten metal. The molten metal is filtered by passing through the porous filter material into the crucible. Filtered molten metal is removed from the crucible with a ladle.

U.S. Pat. Nos. 4,124,506; 4,113,241; and 3,729,097 teach methods and apparatus for filtering molten metal using a floatable crucible in which a portion of the crucible is a porous filter material. The crucible is floated in a bath of molten metal. Molten metal is filtered by passing through the porous filter material into the crucible. The filtered metal is removed from the crucible.

U.S. Pat. Nos. 4,165,235; 4,081,371; 4,024,056; 3,737,305; 3,737,304; 3,537,987; and 3,010,712 teach methods and apparatus for filtering molten metal in which a porous filtering element is placed in a chamber that confines the path of a flowing metal transfer stream. These prior art in-line molten metal filters are not designed for intermittent operation, since they lack means for dampening the initial impact of the molten metal stream, and provisions are not made for uniformly preheating the filters when not in use.

U.S. Pat. Nos. 3,528,801 and 3,305,351 teach various filter materials that can be placed in a filter container, the filter container can in turn be place directly beneath a spout from which molten metal flows. Neither patent teaches a means for dampening the impact of a flowing metal stream, nor a technique for uniformly preheating the filter and/or filter container.

SUMMARY OF INVENTION

The present invention provides an apparatus for intersecting and filtering a molten metal stream. The apparatus includes a filtering vessel, which has sidewalls and a bottom. An outlet passage passes through the bottom of the filtering vessel and is fitted with a filter element. Means are provided for dampening the momentum of the molten metal stream. When not in use the filtering vessel can be placed within a molten metal bath for preheating. The present invention can be used to filter molten metal that is being intermittently transferred.

The present invention also provides a method for filtering a molten metal stream. A filtering vessel, fitted with a filter element, is placed in the path of a flowing molten metal stream. The filtering vessel is preheated by being placing in a molten metal bath contained in a melting furnace, holding furnace or launder. Since the filtering vessel and the filter element are preheated when not in use, molten metal can be intermittently filtered using the apparatus and method of the present invention.

BEST MODES FOR CARRYING OUT THE INVENTION

Figure 1:
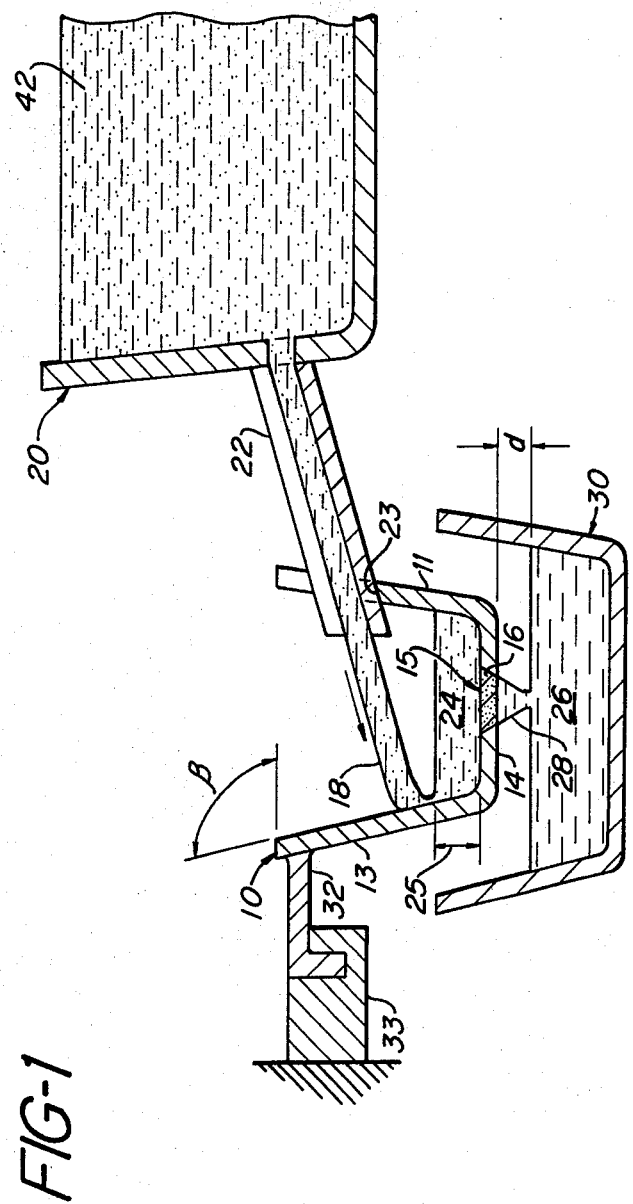
FIG. 1 is a schematic representation of one embodiment of the present invention in which a portion of a sidewall serves to dampen the momentum of the molten metal stream and thereby protect the filter element.

FIG. 1 is a schematic representation of one embodiment of the present invention. The molten metal filtering vessel 10 has sidewalls 11 and 13, and a bottom 14. The bottom 14 has a passage 15 therethrough and is fitted with a filter element 16. A stream of molten metal 18 is directed from a melting or refining furnace 20 through a launder 22, through an opening 23 in the near sidewall 11 of the filtering vessel 10. The stream of molten metal 18 from the launder 22 is directed at the far sidewall 13 in a manner such that the molten metal stream 18 impacts the far sidewall 13. The momentum of the molten metal stream 18 is dampened by the far sidewall 13 before the molten metal contacts the filtering element 16. Preferably the far sidewall 13 is sloped such that an obtuse angle $\beta$ is formed between the sidewall 12 and the bottom 14. The obtuse angle $\beta$ assures that the molten metal will flow down the far sidewall 13 to the filter element 16. It is preferred that $\beta$ be between about 100° and 160° to minimize turbulence. The slopped far sidewall 13 serves to protect the filter element 16 from damage by impact of the molten metal stream 18.

During operation molten metal from the stream 18 collects in the filtering vessel 10 and forms a molten metal pool 24. The molten metal pool 24 provides a head 25 which forces metal through the filter element 16.

Filtered metal 26 exits from the bottom 14 of the filtering vessel 10. The filtered metal 26 forms a stream 28. The filtered metal stream 28 reduces in cross section as the filtered metal stream 28 moves away from the filter element 16. The velocity, of the filtered metal stream 28, increases as the stream 28 moves away from the filter element 16. The filtered metal stream 28 can be directed into a pouring ladle 30 as shown, or alternatively can be directed into a mold, or a holding furnace. It is preferred that the drop, d, of the filtered metal stream 28, be minimized so as to reduce turbulence as the stream 28 flows into the pouring ladle 30, mold or other receptacle. For aluminum alloys d should be preferably less than about 10 inches.

Attached to the filtering vessel 10 is optionally a handle 32 which is used to position the filtering vessel 10. This handle 32 may mount into a bracket 33. This bracket 33 may be rigidly secured to some fixture as illustrated. In the alternative the handle 32 may mount on the ladle 30, or the handle may mount onto any of the other molten metal receptacle such as the mold or the holding furnace.

Figure 2:
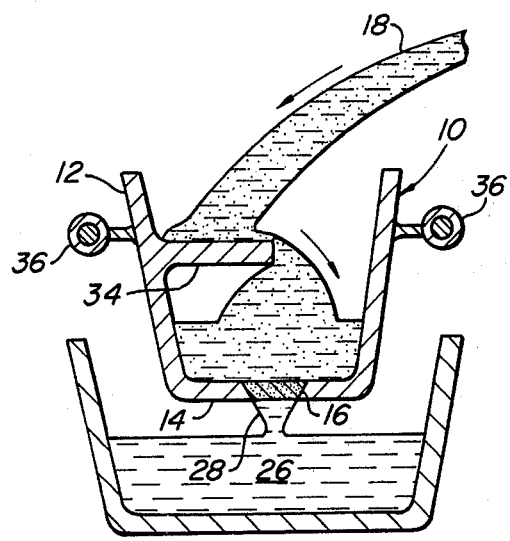
FIG. 2 is a schematic representation of a second embodiment of the present invention in which a baffle extends from a portion of the sidewall to dampen the momentum of the molten metal stream and thereby protect the filter element.

FIG. 2 is a schematic representation of a second embodiment of the present invention. In this embodiment a baffle 34 extends from the sidewall 12 of the filtering vessel 10. The baffle 34 serves to protect the filter element 16 from impact by dampening the momentum of the flowing metal stream 18.

Attached to the filtering vessel 10 shown in FIG. 2 are optionally lugs 36. The lugs 36 provide an alternative means for positioning the filtering vessel 10 with respect to the molten metal stream 18 and may eliminate the need for the handle 32. The lugs 36 may, for example be attached to a hoisting device, not shown, to position the filtering vessel 10.

Figure 3:
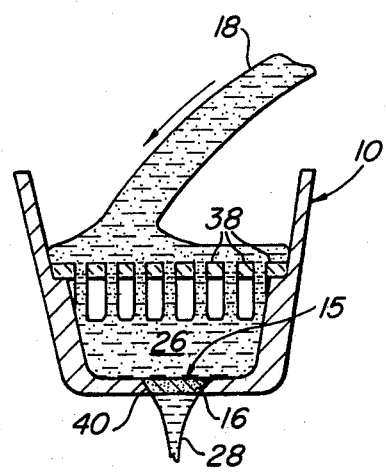
FIG. 3 is a schematic representation of a third embodiment of the present invention in which a mesh is placed in the filtering vessel to dampen the momentum of the molten metal stream and protect the filter element.

FIG. 3 is a schematic representation of a third embodiment of the present invention in which a coarse mesh screen 38 is place in the filtering vessel 10 above the filtering element 16. The course mesh screen 38 dampens the momentum of the molten metal stream 18, and serves to protect the filter element 16 from impact by inclusions that may be contained in the molten metal stream 18. The coarse mesh screen 38 should preferably be made from a material that is ceramic or graphite base. A screen made from steel or iron is not recommended when filtering aluminum alloys since a screen of an iron base material would contaminate the molten aluminum base alloy.

The filtering element 16 as shown in FIG. 3 has tapered walls 40, and the passage 15 has mating tapered surfaces. The largest diameter is nearest the screen, and the smallest diameter is in the plane where the molten metal exits the filter element 16. Tapering the filter as shown in FIG. 3 directs the exiting metal into a narrowed stream, and thereby minimizes the exposure of the filtered molten metal 26 to an oxidizing environment. A filter tapered in this manner and fitted into a mating tapered passage has the further advantage that it will not tend to separate from the filtering vessel during operation, but rather the forces applies by the molten metal stream during operation will tend to compress any seal between the filter element 16 and the filtering vessel 10.

Figure 4:
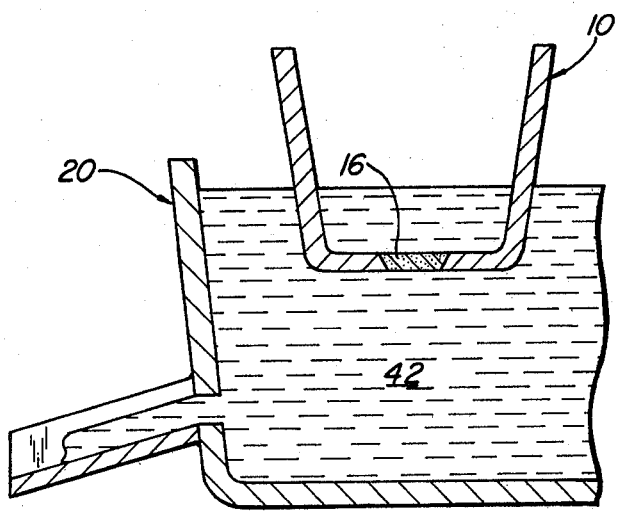
FIG. 4 is a schematic representation of the filtering vessel of the present invention placed in a melting furnace. The passage passing through the bottom of the filtering vessel for accommodating the filter element has vertical sidewalls.

When not in use the filtering vessel 10 can be placed in the melting furnace 20, as shown in FIG. 4. The filtering vessel 10, including the filter element 16 is preheated by the molten metal bath 42 contained in the furnace 20. Preheating the filtering vessel 10 and the filter element 16 will minimize the temperature drop during initial filtering, and thereby reducing the amount of superheat required for the molten metal 42. Reducing the superheat can save energy costs, lessen the interaction of the molten metal with the furnace lining, and reduce the solubility of gases, such as hydrogen, in the molten metal.

If rapid submersion of the filter element 16 is likely to occur when the filtering vessel 10 is placed in the molten metal bath for pre-heating it is preferred, as shown in FIG. 4, that the filter element 16 have vertical rather than tapered walls, and that the filter element 16 be attached to the passage 15 by a refractory cement. When the filter element 16 is attached to the filtering vessel 10 in this manner it has been found to have adequate strength to withstand the shear forces developed during submersion of the filter vessel and during subsequent filling of the filtering vessel with molten metal.

The sidewalls 12 and the bottom 14 of the filtering vessel 10 can be made from any refractory material, including clay graphite, silica/alumina and silicon carbide, however, the sidewalls 12 of the filtering vessel 10 are preferably made from a castable aluminum oxide refractory. Aluminum oxide is preferred since the use of such will reduce the heat loss, and allow the vessel to more rapidly obtaining thermal equilibrium.

The filter element 12 can be made from a variety of ceramic filter materials including, alumina, zirconia, magnesia, titanium dioxide, silica, and mixtures thereof. The type of molten metal being filtered, as well as the size and type of inclusions, should be considered in selecting the filter element material and the filter pore size. For filtering molten aluminum in the apparatus of the present invention a filter with between 10 pores per inch and 40 pores per inch is preferred.

While the novel features of this invention have been described in terms of preferred embodiments and particular applications, it will be appreciated that omissions and substitutions in form and in detail of the apparatus and method may be made by those skilled in the art without departing from the spirit of the invention.

What I claim is:

1. An apparatus for intersecting and filtering a stream of molten metal, comprising:
   a vessel having sidewalls which attach to a bottom;
   an outlet passage through said bottom;
   a filter element fitted to said outlet passage; and
   means within said vessel for dampening the momentum of the molten metal stream wherein said means for dampening the momentum of the molten metal stream being positioned so as to intercept the molten metal stream before said molten metal stream contacts said filter element.

2. The apparatus of claim 1 wherein a far sidewall is slopped and forms an obtuse angle with said bottom, said far sidewall serves to dampen the momentum of the molten metal stream.

3. The apparatus of claim 2 wherein the molten metal, is transported by a launder, the molten metal exits from the end of said launder, and said launder directs molten metal through a passage in a near sidewall of said filtering vessel, and directs said molten metal against said far sidewall.

4. The apparatus of claim 1 wherein said means for dampening the momentum of the molten metal stream is a baffle connected to a portion of said sidewall, said baffle interrupting the flow of said molten metal stream before said molten metal stream impacts said filter.

5. The apparatus of claim 1 wherein said means for dampening the momentum of the molten metal stream is a coarse mesh screen located above the filter element in a position such that said coarse mesh screen interrupts the flow of said molten metal stream before said molten metal stream impacts said filter.

6. The apparatus of claim 1 wherein said filter element has an average pore size between about 40 mil and about 80 mil.

7. The apparatus of claim 6 wherein said vessel is made from a castable aluminum oxide refractory.

8. The apparatus of claim 7 wherein said filter element and said outlet passage are tapered to produce a monotonically decreasing cross sectional area of the filter element with the greatest cross section in closest proximity to the top of said filtering vessel.

9. The apparatus of claim 1 wherein said filter element has vertical sidewalls and said filter element is held in place by a refractory cement.

10. A method for filtering a molten metal stream discharged from a melting furnace comprising:
   directing the molten metal stream onto a surface within a vessel to dissipate the momentum of the molten metal stream;
   collecting the molten metal from said surface in said vessel;
   passing said collected molten metal through a filter element which is an integral part of said vessel; and
   collecting said molten metal in a ladle.

11. The method of claim 10 wherein said filter element is maintained at not greater than 10 inches from the collected molten metal in the said ladle.

12. The method of claim 10 or 11 further comprising the step of preheating said filtering vessel containing said filter element in a bath of molten metal.

* * * * *